United States Patent Office 3,213,123
Patented Oct. 19, 1965

3,213,123
HYDROCARBONTHIOPHOSPHONOXYDIHY-
DROXYALKOXYALKYL HYDROCARBYL-
AMINE
James M. Petersen, Fishkill, David D. Reed, Glenham,
and Herman D. Kluge, deceased, late of Fishkill, by
Hazel E. Kluge, administratrix, Fishkill, N.Y., as-
signors to Texaco Inc., New York, N.Y., a corporation
of Delaware
No Drawing. Filed Oct. 18, 1962, Ser. No. 232,649
11 Claims. (Cl. 260—461)

This invention pertains to novel reaction products of N - mono - (or N,N-bis-)hydrocarbonthiophosphonoxyhydroxyalkyl-N,N-di-(or N-mono-)hydrocarbylamines and hydroxyepoxyalkanes. More particularly, it pertains to N-mono-(or N,N-bis-)hydrocarbonthiophosphonoxydihydroxyalkoxyalkyl - N,N - di - (or N - mono-)hydrocarbylamines and their method of manufacture.

The N-mono-(or N,N-bis-)hydrocarbonthiophosphonoxydihydroxyalkoxyalkyl-N,N-di-(or N-mono-)hydrocarbylamines contemplated herein have been found to be effective as thermal stability additives for fuels, e.g., jet fuels.

The N-mono-(or N,N-bis-)hydrocarbonthiophosphonoxydihydroxyalkoxyalkyl-N,N-di-(or N-mono-)hydrocarbylamines, hereafter known for the sake of brevity as thiophosphonoxyalkoxyalkylhydrocarbylamines, are represented by the formula:

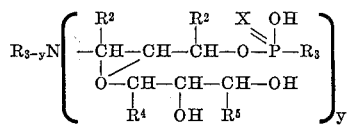

wherein R is alkyl, aryl, alkaryl, or aralkyl of from 1 to 20 carbons, $R^1$, $R^2$, $R^4$ and $R^5$ are hydrogen or alkyl radicals of from 1 to 6 carbons, $R^3$ is hydrocarbyl (monovalent hydrocarbon derived radical), X is sulfur or a mixture of oxygen and sulfur and y is an integer from 1 to 2 inclusively.

Broadly, the novel compounds of the invention are prepared by reacting at elevated temperatures under acid or basic conditions, a hydroxyepoxyalkane with a thiophosphonoxyhydroxyalkylhydrocarbylamine.

THIOPHOSPHONOXYHYDROXYALKYL-HYDROCARBYLAMINE REACTANT

The thiophosphonoxyhydroxyalkylhydrocarbylamines and their method of manufacture are described in co-assigned, co-pending application Serial No. 233,180 filed October 18, 1962. As described therein the thiophosphonoxyhydroxyalkylhydrocarbylamines of the formula:

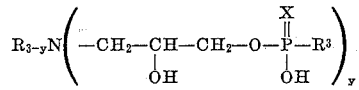

are derived from the reaction of a thiophosphonic acid of the formula:

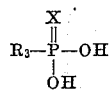

with an epoxyalkylhydrocarbylamine of the formula:

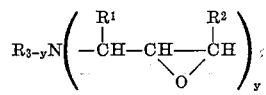

where $R^1$, $R^2$, $R^3$, X and y are as heretofore defined. The thiophosphonic acid in turn is derived from a hydrocarbon-$P_2S_5$ reaction product. As pointed out in co-assigned, copending application Serial No. 233,180, $R^3$ in the previous formula comes from the hydrocarbon portion of the hydrocarbon-$P_2S_5$ reaction product.

The hydrocarbons contemplated herein for the reaction with the $P_2S_5$ can be aliphatic, cycloaliphatic, aromatic, alkarene or aralkane hydrocarbons. Lubricating fractions of cracked hydrocarbon fractions also comprise another desirable class of hydrocarbon materials for reaction with $P_2S_5$.

The preferred hydrocarbons for reaction with $P_2S_5$ are olefins. The olefinic hydrocarbons advantageously contained at least 12 carbon atoms although a lower molecular weight olefin can be employed. Examples of olefinic polymers contemplated herein are the mono-olefinic polyisobutene, polybutene, polypropylene, and copolymers such as the copolymer of butadiene and isobutylene. Generally, olefin polymers and copolymers having an average molecular weight between 250 and 50,000 are employed. Polymers and copolymers having an average molecular weight between 500 to 5,000 are preferred. A specific preferred mono-olefinic polymer is polybutene having an average molecular weight of between 600 and 5,000.

The reaction product obtained by reacting $P_2S_5$ (about 5-40 wt. percent of reaction mass) with a hydrocarbon at a temperature of from about 100–320° C. in an inert atmosphere, for example, under a blanket of nitrogen, is treated at a temperature between about 100 and 260° C. by contact with steam. Steam treatment hydrolyzes the hydrocarbon-$P_2S_5$ reaction product to a hydrocarbonthiophosphonic acid and inorganic phosphorus acids. The hydrocarbonthiophosphonic acid has the general formula:

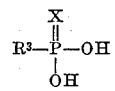

wherein $R^3$ is hydrocarbyl radical derived from the hydrocarbon reacted with $P_2S_5$. $R^3$ is usually an olefinic radical containing 20 to 200 carbon atoms and X is sulfur or a mixture of oxygen and sulfur. X in the above formula is designated as sulfur or a mixture of sulfur and oxygen because the steam hydrolysis step usually results in the replacement of a portion of the sulfur joined to the phosphorus with oxygen.

The inorganic phosphorus acids formed during hydroylsis are removed prior to reaction of the thiophosphonic acid with the epoxyalkylhydrocarbylamine reactant. A number of different procedures are available for removal of the inorganic phosphorus acids. In U.S. Patents Nos. 2,951,835 and 2,987,512 removal of the inorganic phosphorus acids is affected by contact with synthetic hydrous alkali metal silicates and synthetic hydrous alkaline earth metal silicates, respectively. Commonly-assigned, co-pending application, Serial No. 841,668, filed September 23, 1959, by H. D. Kluge and R. G. Lacoste, describes a process wherein inorganic phosphorus acids are removed from the hydrolyzed product by extraction with anhydrous methanol.

The epoxyalkylhydrocarbylamine reactant which reacts with the hydrocarbonthiophosphonic acid to form the thiophosphonoxyhydrocarbylamines are represented by the general formula:

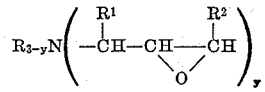

where R, $R^1$ and $R^2$ and y are as heretofore defined.

Examples of the epoxyalkylhydrocarbylamines contemplated herein are 2,3-epoxypropyl diethylamine, N,N-bis-(2,3-epoxypropyl) butylamine, N,N-bis(2,3-epoxypropyl)

aniline, N,N-bis(1-methyl-2,3-epoxybutyl) benzylamine and N,N-bis(2,3-epoxypropyl) tolylamine.

Reaction of the epoxyalkylhydrocarbylamine with the hydrocarbonthiophosphonic acid to produce the thiophosphonoxyhydrocarbylamines is effected at a temperature between about 25 and 175° C. and at an epoxide to acid reactant mole ratio of between about 0.7:1 and 2:1. Atmospheric, superatmospheric and subatmospheric pressure may be employed with atmospheric pressure being preferred.

Examples of the thiophosphonoxyhydroxyalkylhydrocarbylamines contemplated herein are 3-polybutene(940 M.W. thiophosphonoxy-2-hydroxypropyldiethylamine, 3-polybutene(940 M.W.)thiophosphonoxy - 2 - hydroxyprophydiphenylamine, 3-polypropylene(2500 M.W.)thiophosphonoxy-1,3-dimethyl-2-hydroxypropyldibenzylamine, bis (3-polybutene(940 M.W.)thiophosphonoxy - 2 - hydroxypropyl)butylamine, bis(3-polybutene(940 M.W.)thiophosphonoxy-2-hydroxypropyl)phenylamine, and bis(3-polypentene(1500 M.W.)thiophosphonoxy-1,3-diethyl - 2-hydroxypropyl)tolylamine.

HYDROXYEPOXYALKANE REACTANT

The hydroxyepoxyalkanes suitable for reaction with the hydrocarbylamine reactant for forming the desired thiophosphonoxyalkoxyhydrocarbylamines of the invention have the general formula:

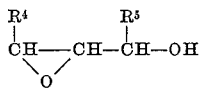

where $R^4$ and $R^5$ are hydrogen or alkyl from 1 to 6 carbons. Examples of the hydroxyepoxyalkanes contemplated herein are 3-hydroxy-1,2-epoxypropane, 1-hydroxy-2,3-epoxybutane and 3-hydroxy-3-ethyl-1,2-epoxypropane.

CATALYST

As heretofore stated, an acid or base should be present in the reaction for the facilitation of the reaction. Examples of the acid and base catalysts contemplated herein are the Lewis acids, mineral acids, organic acids, alkali metals and alkali metal alcoholates. Specific examples of catalysts are $BF \cdot C_2H_5OC_2H_5$ (boron trifluoride etherate), $BF_3$, HF, $AlCl_3$, $SnCl_4$, $TiCl_4$, $ZnCl_2$, $H_2SO_4$, $H_3PO_4$, $CCl_3CO_2H$, $CF_3CO_2H$, Na, and $C_2H_5OK$.

PREPARATION OF THE THIOPHOSPHONOXY ALKOXYALKYLHYDROCARBYLAMINE PRODUCT

Specifically, the thiophosphonoxyalkoxyalkylhydrocarbylamines are prepared by reacting the thiophosphonoxyhydroxyalkylhydrocarbylamine with the hydroxyepoxyalkane in the presence of catalyst at a temperature of between about 25 and 150° C. in a reactant mole ratio of hydroxyepoxyalkane to hydrocarbylamine reactant to acid catalyst of between about 1:1:0.001 and 5:1:0.1. Although superatmospheric and subatmospheric pressures may be employed, atmospheric pressure is generally utilized.

The product can be purified by standard means such as stripping out unreacted reactants at elevated temperature, e.g., above 93° C. and reduced pressure between about 0.01 and 30 mm. Hg utilizing an inert gas such as nitrogen as stripping agent. Those impurities not removed by stripping at a reduced temperature can be removed by other suitable means such as by clay contacting or contacting with ion exchange resins.

Specific examples of the thiophosphonoxyalkoxyalkylhydrocarbylamine products contemplated herein are 3-polybutene(940 M.W.)thiophosphonoxy - 2-(2',3'-dihydroxypropoxy)propyldiethylamine; 3-polypropylene(1500 M.W.)thiophosphonoxy - 2(2',3'-dihydroxypropoxy)propyldiphenylamine; 3-polyisobutene(2500 M.W.) thiophosphonoxy - 2 - (1'-ethyl-2',3'-dihydroxybutoxy)-1,3-dimethylpropyldibenzylamine; bis[3 - polybutene(940 M.W.)thiophosphonxy - 2-(2',3'-dihydroxypropoxy)propyl] butylamine; and bis[polybutene(940 M.W.) thiophosphonoxy-2-(2',3' - dihydroxypropoxy)propyl]tolylamine.

The following examples further illustrate the invention by demonstrating the preparation of the thiophosphonoxyalkoxyalkylhydrocarbylamines contemplated herein. The examples, however, are not to be construed as limitations thereof.

Example I 261 grams of a naphthenic oil solution containing 0.1 mole of 3-polybutene(940 M.W.)thiophosphonoxy-2-hydroxypropyldiethylamine of the formula:

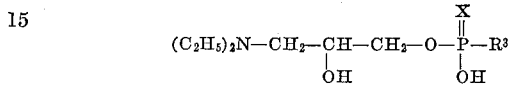

where $R^3$ is a polybutene derived radical having an average molecular weight of 940 and X is a mixture of oxygen and sulfur (0.5 wt. percent sulfur based on oil solution) were added to a 1-liter, 3-neck flask equipped with a stirrer, a dropping funnel, gas inlet tube, thermometer and reflux condenser. In addition, there was added 7.5 grams (0.1 mole) 3-hydroxy-1,2-epoxypropane (glycidol) and 1.4 grams (0.1 mole) boron trifluoride etherate. The reaction mixture was heated to 93° C. with stirring and nitrogen blowing for a period of 2 hours. At the end of the reaction period, the unreacted epoxyalkane was stripped out by nitrogen blowing at a temperature of 93° C. under a pressure of 1–2 mm. Hg. The stripped product was identified as 3-polybutene(940 M.W.)thiophosphonoxy - 2 - (2',3'-dihydroxypropoxy)propyldiethylamine in oil of the formula:

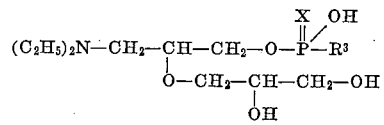

wherein R is a polybutene derived radical having an average molecular weight of 940 and X is a mixture of sulfur and oxygen. This product analyzed as follows:

| Description | Calculated | Found |
| --- | --- | --- |
| Phosphorus, wt. percent | 1.17 | 0.98 |
| Nitrogen, wt. percent | 0.55 | 0.41 |
| Hydroxyl No | 33.8 | 33 |
| Neut. No | 0 | 2.15 |

Example II

The procedure of Example I was repeated except the amine reactant was a 138 grams of a naphthene oil solution containing 0.05 mole of 3-polybutene(940 M.W.) thiophosphonoxy-2-hydroxypropyldiphenylamine of the formula:

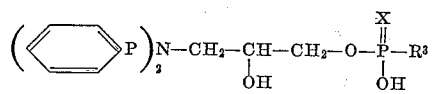

wherein $R^3$ is a polybutene radical having an average molecular weight of 940 and X is a mixture of oxygen and sulfur (0.5 wt. percent sulfur based on oil solution). Also utilized in the procedure were 3.7 grams (0.05 mole) glycidol and 0.7 gram (0.005 mole) boron trifluoride etherate. The stripped product was found to be 3-polybutene(940 M.W.)thiophosphonoxy - 2(2',3'-dihydroxypropoxy)propyldiphenylamine in oil of the formula:

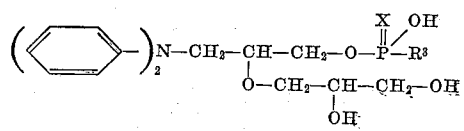

wherein $R^3$ and X are as heretofore defined. This product analyzed as follows:

| Description | Calculated | Found |
|---|---|---|
| Phosphorus, wt. percent | 1.10 | 0.89 |
| Nitrogen, wt. percent | 0.35 | 0.58 |
| Hydroxyl No | 33.4 | 32 |
| Neut. No | 0 | 7.11 |

*Example III*

The procedure of Example I was essentially repeated except the amine reactant employed was 258 grams of a naphthene oil solution containing 0.05 mole of bis(3-polybutene (940 M.W.)thiophosphonoxy-2-hydroxypropyl) butylamine. The reaction product obtained was identified as bis 3-polybutene (940 M.W.)thiophosphonoxy-2-(2′,3′-dihydroxypropoxy)propyl butylamine in oil, of the formula:

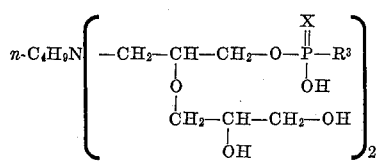

where $R^3$ and X are as heretofore defined. The product analyzed as follows:

| Description | Calculated | Found |
|---|---|---|
| Phosphorus, wt. percent | 1.18 | 1.0 |
| Nitrogen, wt. percent | 0.53 | 0.56 |
| Hydroxyl No | 35.5 | 41 |
| Neut. No | 0 | 1.65 |

*Example IV*

The procedure of Example I was essentially repeated except the amine reactant employed was 258 grams of an oil solution containing 0.05 mole of bis(3-polybutene (940 M.W.)thiophosphonoxy - 2-hydroxypropyl)phenylamine of the formula:

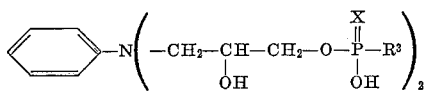

where $R^3$ is a polybutene radical (mono-olefinic) of an average molecular weight of 940 and X is a mixture of sulfur and oxygen (0.5 wt. percent sulfur based on oil solution). The reaction product obtained was identified as bis 3-polybutene(940 M.W.)thiophosphonoxy-2-(2′,3′-dihydroxypropoxy propylphenylamine of the formla:

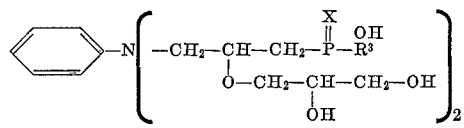

where $R^3$ and X are as heretofore defined. The reaction product analyzed as follows:

| Description | Calculated | Found |
|---|---|---|
| Phosphorus, wt. percent | 1.17 | 0.90 |
| Nitrogen, wt. percent | 0.527 | 0.56 |
| Hydroxyl No | 42.2 | 53 |
| Neut. No | 0 | 3.1 |
| Mole ratio glycidol/amine reactants in product | 1 | 1 |

We claim:
1. A thiophosphonoxyalkoxyalkylhydrocarbylamine of the formula:

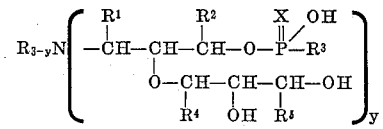

where R is a monovalent hydrocarbon derived radical selected from the group consisting of alkyl, phenyl, alkylphenyl and phenylalkyl of not more than 20 carbons, $R^1$, $R^2$, $R^4$ and $R^5$ are radicals selected from the group consisting of hydrogen and alkyl of from 1 to 6 carbons, $R^3$ is hydrocarbyl derived from a aliphatic polyolefin having a molecular weight between 250 and 50,000, X is a chalcogen selected from the group consisting of sulfur and a mixture consisting of a major portion of sulfur and a minor portion of oxygen, and y is an integer from 1 to 2 inclusively.

2. A thiophosphonoxyalkoxyalkylhydrocarbylamine in accordance with claim 1 wherein $R^3$ is a polybutene derived radical having a molecular weight of 940, R is ethyl, $R^1$, $R^2$, $R^4$, and $R^5$ are hydrogen, X is a mixture consisting of a major portion of sulfur and a minor portion of oxygen and y is 2.

3. A thiophosphonoxyalkoxyalkylhydrocarbylamine in accordance with claim 1 wherein R is phenyl, $R^1$, $R^2$, $R^4$ and $R^5$ are hydrogen, $R^3$ is a polybutene derived radical having an average molecular weight of 940, X is a mixture consisting of a major portion of sulfur and a minor portion of oxygen and y is 2.

4. A thiophosphonoxyalkoxyalkylhydrocarbylamine in accordance with claim 1 wherein R is butyl, $R^1$, $R^2$, $R^4$, and $R^5$ are hydrogen, $R^3$ is a polybutene derived radical having an average molecular weight of about 940, X is a mixture consisting of a major portion of sulfur and a minor portion of oxygen and y is 1.

5. A thiophosphonoxyalkoxyalkylhydrocarbylamine in accordance with claim 1 wherein R is phenyl, $R^1$, $R^2$, $R^4$, and $R^5$ are hydrogen, $R^3$ is a polybutene derived radical having an average molecular weight of about 940, X is a mixture consisting of a major portion of sulfur and a minor portion of oxygen and y is 1.

6. A method of preparing a thiophosphonoxyalkoxyalkylhydrocarbylamine of the formula:

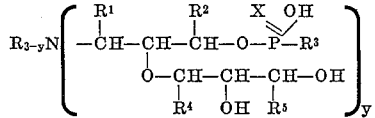

where R is a monovalent hydrocarbon derived radical of not more than 20 carbons selected from the group consisting of alkyl, phenyl, alkylphenyl and phenylalkyl, $R^1$, $R^2$, $R^4$, and $R^5$ are radicals selected from the group consisting of hydrogen and alkyl of from 1 to 6 carbons, $R^3$ is hydrocarbyl derived from an aliphatic polyolefin having a molecular weight between 250 and 50,000, X is a chalcogen selected from the group consisting of sulfur and a mixture consisting of a major portion of sulfur and a minor portion of oxygen, and y is an integer of from 1 to 2 inclusively, comprising contacting a hydrocarbonthiophosphonoxyhydroxyalkylhydrocarbylamine of the formula:

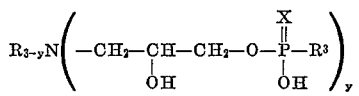

with a hydroxyepoxyalkane of the formula:

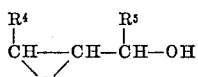

where R, $R^1$, $R^2$, $R^3$, $R^4$, $R^5$, X and y are as heretofore defined in the presence of a catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$, $CCl_3CO_2H$, $CF_3CO_2H$, Na, and $C_2H_5OK$ at a temperature between about 25 and 150° C. in a mole ratio of epoxyalkane to hydrocarbylamine reactant to catalyst of between about 0.1:1:0.001 and 5:1:0.1.

7. A method in accordance with claim 6 wherein R is ethyl, $R^1$, $R^2$, $R^4$, and $R^5$ are hydrogen, $R^3$ is polybutene derived radical of an average molecular weight of 940, X is a mixture consisting of a major portion of sulfur and a minor portion of oxygen, $y$ is 2 and said catalyst is boron trifluoride etherate.

8. A method in accordance with claim 6 wherein R is phenyl, $R^1$, $R^2$, $R^4$, and $R^5$ are hydrogen, X is a mixture consisting of a major portion of sulfur and a minor portion of oxygen, $y$ is 2 and said catalyst is boron trifluoride etherate.

9. A method in accordance with claim 6 wherein R is butyl, $R^1$, $R^2$, $R^4$, and $R^5$ are hydrogen, $R^3$ is a polybutene derived radical having an average molecular weight of 940, X is a mixture consisting of a major portion of sulfur and a minor portion of oxygen, $y$ is 1 and said catalyst is boron trifluoride etherate.

10. A method in accordance with claim 6 wherein R is phenyl, $R^1$, $R^2$, $R^4$, and $R^5$ are hydrogen, $R^3$ is a polybutene derived radical having an average molecular weight of 940, X is a mixture consisting of a major portion of sulfur and a minor portion of oxygen, $y$ is 1 and said catalyst is boron trifluoride etherate.

11. A method of preparing an N-hydrocarbonthiophosphonoxydihydroxyalkoxyalkyl-N-hydrocarbylamine comprising
(a) reacting $P_2S_5$ with an aliphatic polyolefin hydrocarbon having an average molecular weight between 250 and 50,000, at a temperature between about 100 and 320° C. in an inert atmosphere, the $P_2S_5$ constituting between about 5 and 40 wt. percent of the reaction mass,
(b) contacting the resultant $P_2S_5$-aliphatic polyolefin hydrocarbon reaction mass with steam at a temperature between about 100 and 260° C. and removing formed inorganic phosphorus acids from the steam treated reaction mixture,
(c) contacting the resultant inorganic phosphorus acid free, steam treated reaction mixture with an epoxyamine of the formula:

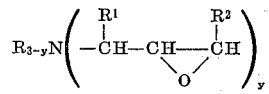

where R is selected from the group consisting of alkyl, phenyl, alkylphenyl and phenylalkyl of from 1 to 20 carbons and $R^1$ and $R^2$ are selected from the group consisting of hydrogen and alkyl of from 1 to 6 carbons and $y$ is an integer from 1 to 2, at a temperature between about 25 and 175° C., and at a mole ratio of said resultant reaction mixture to said epoxyamine of between about 1:0.7 and 1:2,
(d) reacting the resultant epoxyamine reaction product formed with said inorganic phosphorus acid free, steam treated reaction mixture with a hydroxyepoxyalkane of the formula:

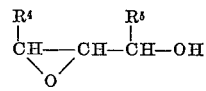

where $R^4$ and $R^5$ are members selected from the group consisting of hydrogen and alkyl of from 1 to 6 carbons in the presence of a catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$, $CCl_3CO_2H$, $CF_3CO_2H$, Na, and $C_2H_5OK$, at a temperature between about 25 and 150° C. in a mole ratio of said epoxyalkane to said resultant epoxyamine reaction product to said catalyst of between about 0.1:1:0.001 and 5:1:0.1.

No references cited.

CHARLES B. PARKER, *Primary Examiner.*
IRVING MARCUS, *Examiner.*

UNITED STATES PATENT OFFICE
CERTIFICATE OF CORRECTION

Patent No. 3,213,123                 October 19, 1965

James M. Petersen et al.

It is hereby certified that error appears in the above numbered patent requiring correction and that the said Letters Patent should read as corrected below.

Column 1, lines 30 to 35, the formula should appear as shown below instead of as in the patent:

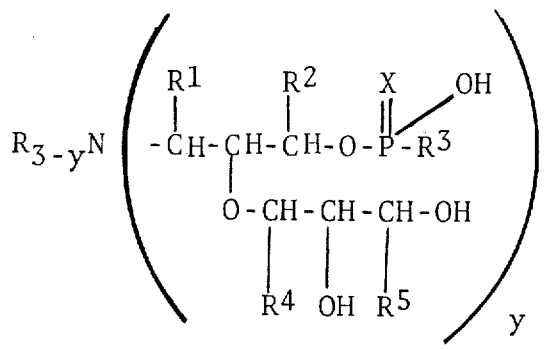

column 3, lines 14 and 15, for "-2-hydroxyprophydiphenylamine" read -- -2-hydroxypropyldiphenylamine --; column 4, lines 56 to 60, the formula should appear as shown below instead of as in the patent:

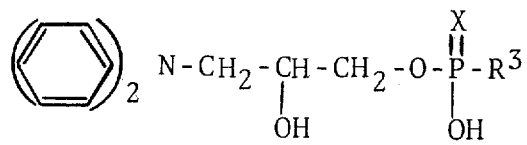

Signed and sealed this 14th day of June 1966.

(SEAL)
Attest:

ERNEST W. SWIDER                         EDWARD J. BRENNER
Attesting Officer                     Commissioner of Patents